United States Patent
Bain et al.

(10) Patent No.: US 9,720,398 B2
(45) Date of Patent: Aug. 1, 2017

(54) METHOD AND APPARATUS FOR CUSTOMIZING TOOL PATHS FOR AIRCRAFT PARTS

(71) Applicant: The Boeing Company, Chicago, IL (US)

(72) Inventors: David Michael Bain, Glen Iris (AU); Martin Alexander Szarski, Canterbury (AU); Phillip John Crothers, Hampton East (AU)

(73) Assignee: THE BOEING COMPANY, Chicago, IL (US)

( * ) Notice: Subject to any disclaimer, the term of this patent is extended or adjusted under 35 U.S.C. 154(b) by 580 days.

(21) Appl. No.: 13/743,650

(22) Filed: Jan. 17, 2013

(65) Prior Publication Data
US 2014/0172152 A1    Jun. 19, 2014

Related U.S. Application Data

(60) Provisional application No. 61/739,448, filed on Dec. 19, 2012.

(51) Int. Cl.
*G06F 17/50* (2006.01)
*G05B 19/408* (2006.01)

(52) U.S. Cl.
CPC .......... *G05B 19/4083* (2013.01); *G05B 2219/36504* (2013.01)

(58) Field of Classification Search
None
See application file for complete search history.

(56) References Cited

U.S. PATENT DOCUMENTS

| | | | |
|---|---|---|---|
| 6,278,457 B1 * | 8/2001 | Bernardini | G06T 17/20 345/420 |
| 7,983,790 B2 | 7/2011 | Crothers et al. | |
| 2009/0088890 A1 * | 4/2009 | Glaesser et al. | 700/160 |
| 2010/0161100 A1 * | 6/2010 | Crothers et al. | 700/105 |
| 2010/0241264 A1 * | 9/2010 | Graham | G05B 19/4083 700/105 |

OTHER PUBLICATIONS

'ANSYS Modeling and Meshing Guide', ANSYS, Inc. 2005, Chapter 7, pp. 7-13 and 7-29.*
Gao et al. 'Adaptive restoration of complex geometry parts through reverse engineering application' Advances in Engineering Software 37 (2006) 592-600.*

* cited by examiner

*Primary Examiner* — Mohammad Ali
*Assistant Examiner* — Bernard G Lindsay
(74) *Attorney, Agent, or Firm* — Yee & Associates, P.C.

(57) ABSTRACT

A method and apparatus for customizing tool paths. A reference tool path is identified for a tool based on an expected shape for a surface of an object. Offset data is generated for a plurality of sample points identified for use in evaluating the surface of the object. The offset data identifies a difference between the expected shape for the surface of the object and an actual shape of the surface of the object. The reference tool path is modified using the offset data to form a modified tool path for the tool.

18 Claims, 11 Drawing Sheets

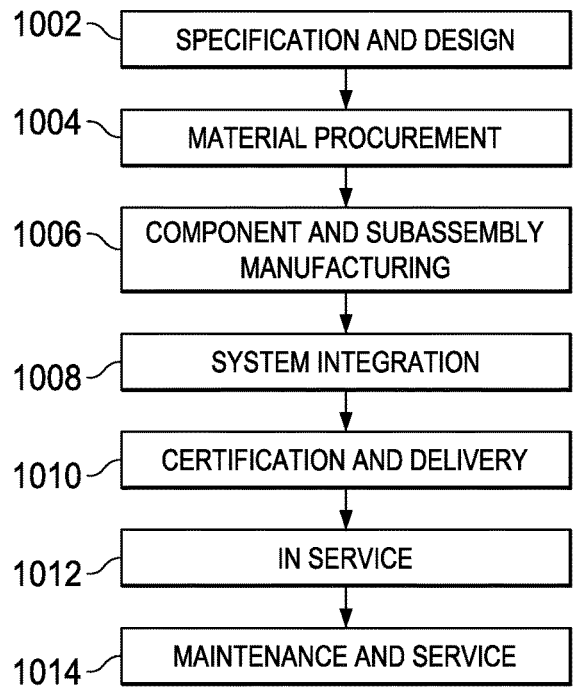
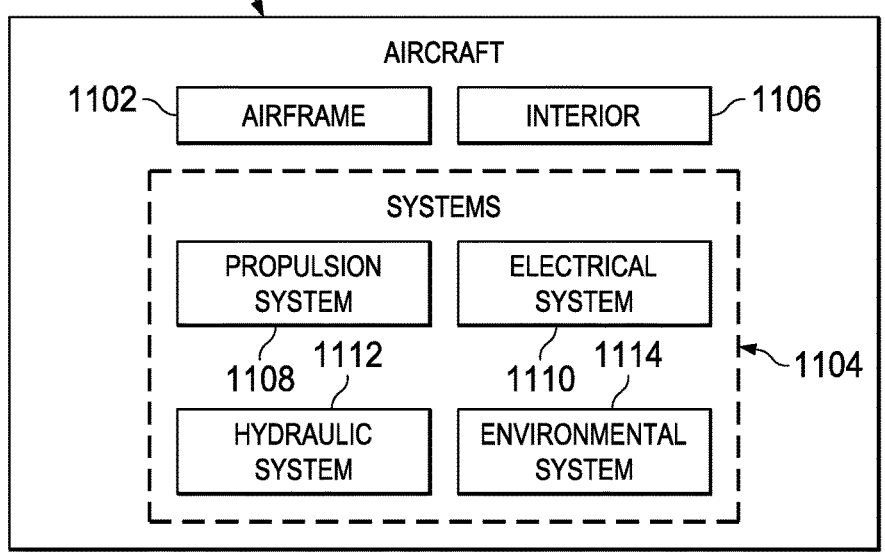

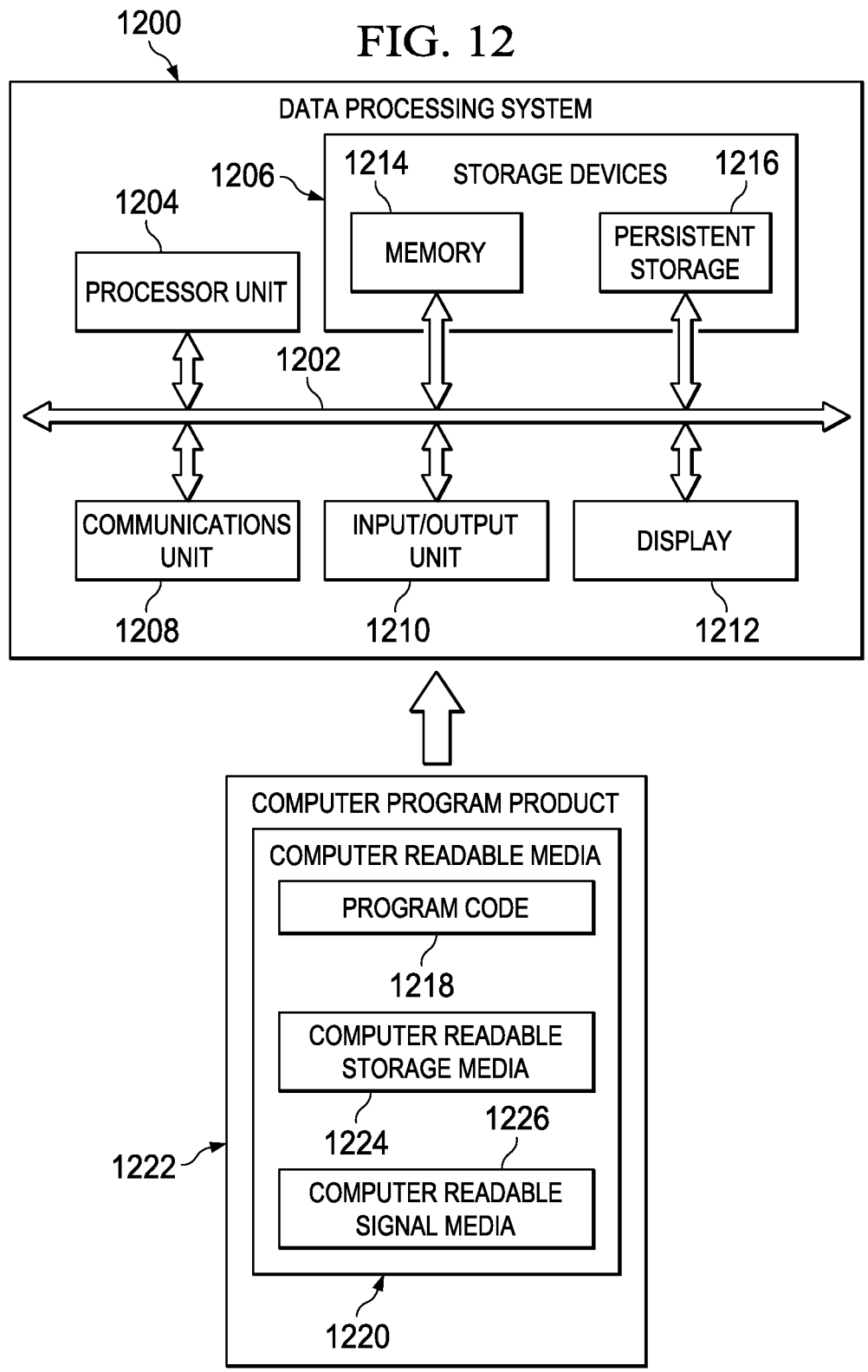

METHOD AND APPARATUS FOR CUSTOMIZING TOOL PATHS FOR AIRCRAFT PARTS

RELATED PROVISIONAL APPLICATION

This application is related to and claims the benefit of priority of U.S. Provisional Patent Application Ser. No. 61/739,448, filed Dec. 19, 2012, entitled "Method and Apparatus for Customizing Tool Paths", which is incorporated herein by reference.

BACKGROUND INFORMATION

1. Field

The present disclosure relates generally to performing operations at the surfaces of objects and, in particular, to performing these operations using a customized tool path for each of the objects. Still more particularly, the present disclosure relates to a method and apparatus for customizing the tool paths used for these objects to account for variations in the overall shapes of these objects.

2. Background

A tool path is the path that a tool may traverse to perform an operation on an object. For example, a tool path may be the path that a cutting tool follows to remove material from an object. A tool path may be comprised of a series of points. Each point may correspond to a position within a reference coordinate system and, in some cases, may also correspond to an orientation. Oftentimes, tool paths are generated by computer programs based on various factors. These factors may include, for example, without limitation, the initial shape of the object being processed, the tool that has been selected for use, a speed at which the operation is to be performed, a desired fineness of cut, and/or other types of factors.

In certain situations, the same operation may need to be performed on a large number of parts of the same type. For example, in some cases, the same machining operation may need to be performed on each part in a group of parts that includes hundreds, thousands, or tens of thousands of parts of the same type.

In order to achieve a desired level of accuracy while performing the operation on each of the parts, the tool path used to perform the operation may need to be tailored to the shape of each part. For example, during the manufacturing, transportation, storage, and/or usage of these parts, one or more portions of each of the parts may have been deformed over time such that the overall shape of each of the parts varies. These variations may need to be taken into account when performing an operation on these parts.

With some currently available techniques, a tool path may be generated for each part based on a three-dimensional model or digital scan of the part. However, generating a three-dimensional model and/or digital scan for each of these parts may require more time, effort, and/or processing power than desired. In addition to being time-consuming, this process may also be more expensive than desired.

As a result, other currently available techniques may rely on human operators using hand tools to manually perform the operations on the parts. For example, a human operator may perform a sanding operation in stages to ensure that material up to a specified depth has been removed from the surface of a part with a desired level of accuracy. However, this process may be much more time-consuming and labor-intensive than desired and may require a greater number of human operators than desired. Therefore, it would be desirable to have a method and apparatus that takes into account at least some of the issues discussed above, as well as other possible issues.

SUMMARY

In one illustrative embodiment, a method is provided. A reference tool path is identified for a tool based on an expected shape for a surface of an object. Offset data is generated for a plurality of sample points identified for use in evaluating the surface of the object. The offset data identifies a difference between the expected shape for the surface of the object and an actual shape of the surface of the object. The reference tool path is modified using the offset data to form a modified tool path for the tool.

In another illustrative embodiment, a computer-implemented method is provided. A reference tool path is identified for a tool based on an expected shape for surfaces of a group of objects of a same type. A sampling path comprising a plurality of sample points is identified for use in evaluating the surfaces of the group of objects. A plurality of measurements generated for the plurality of sample points by a surface measurement device is received. Offset data is generated using the plurality of measurements. The reference tool path is modified using the offset data to form a modified tool path for the tool.

In yet another illustrative embodiment, an apparatus comprises a path manager configured to identify a reference tool path for a tool based on an expected shape for a surface of an object. The path manager is configured to generate offset data for a plurality of sample points identified for use in evaluating the surface of the object. The path manager is further configured to modify the reference tool path using the offset data to form a modified tool path for the tool.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 10 is an illustration of an aircraft manufacturing and service method in the form of a block diagram in accordance with an illustrative embodiment;

FIG. 11 is an illustration of an aircraft in the form of a block diagram in accordance with an illustrative embodiment; and FIG. 12 is an illustration of a data processing system in the form of a block diagram in accordance with an illustrative embodiment.

DETAILED DESCRIPTION

The illustrative embodiments recognize and take into account different considerations. For example, the illustrative embodiments recognize and take into account that it may be desirable to have an automated system for machining large numbers of parts. Additionally, the illustrative embodiments recognize and take into account that it may be desirable to have a system capable of modifying the tool path used for each of a group of parts without requiring a full three-dimensional model and/or digital scan of each of the parts.

Thus, the illustrative embodiments provide a method and apparatus for customizing tool paths. In one illustrative embodiment, a reference tool path is identified for a tool based on an expected shape for a surface of an object. Offset data is generated for a plurality of sample points identified for use in evaluating the surface of the object. The offset data identifies a difference between the expected shape for the surface of the object and an actual shape of the surface of the object. The reference tool path is modified using the offset data to form a modified tool path for the tool.

Figure 1:
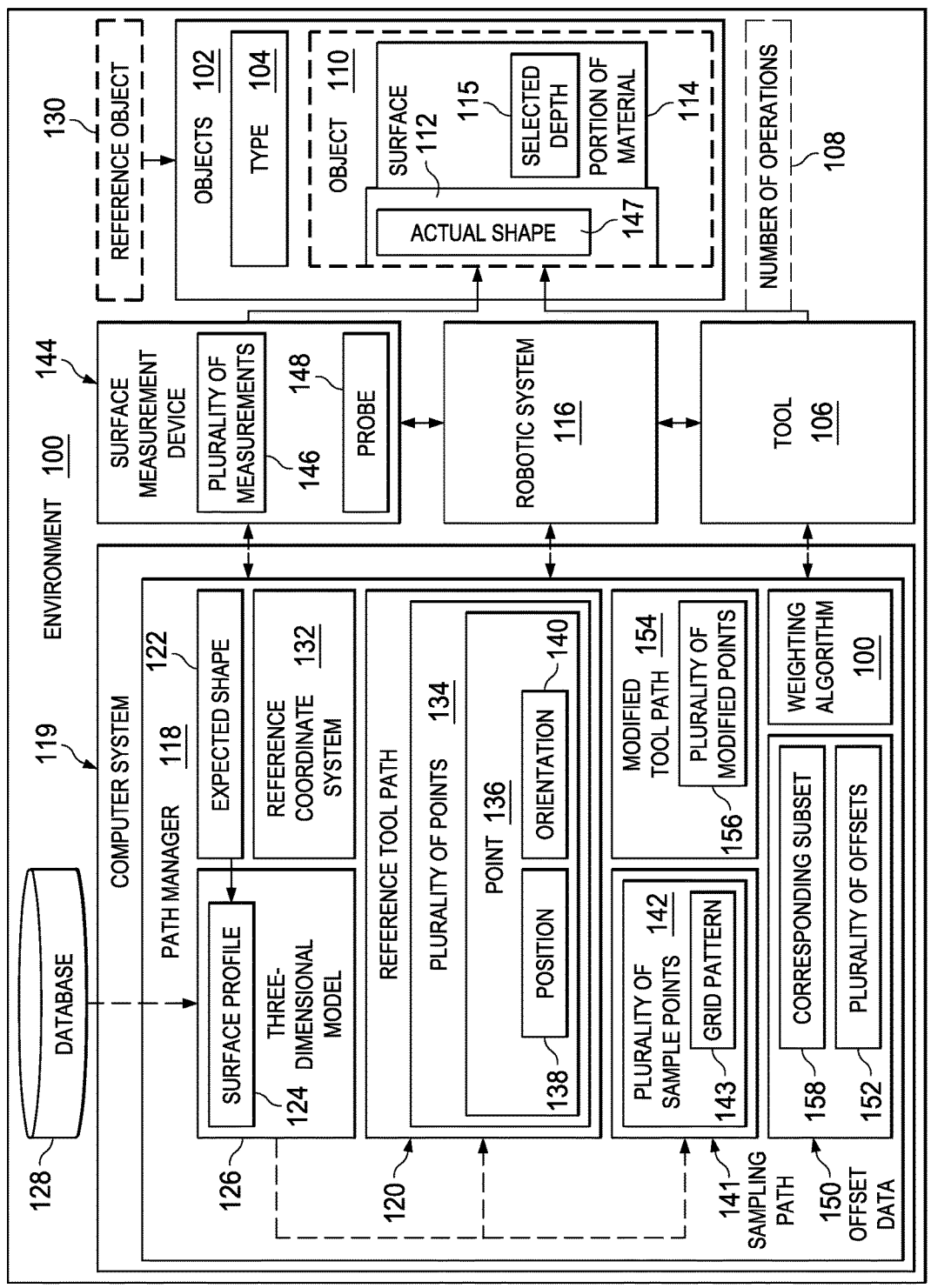
FIG. 1 is an illustration of an environment in which objects are processed in the form of a block diagram in accordance with an illustrative embodiment.

Referring now to the figures, and in particular, with reference to FIG. 1, an illustration of an environment in which objects are processed is depicted in the form of a block diagram in accordance with an illustrative embodiment. As depicted, objects 102 may be processed within environment 100. Objects 102 may all be of the same type 104. As one illustrative example, objects 102 may take the form of parts of the same type. For example, objects 102 may include several thousand composite panels of the same type manufactured according to the same specifications.

The processing of objects 102 may be performed using tool 106. Tool 106 may be used to perform number of operations 108 on each of objects 102. As used herein, a "number of" items may be one or more items. In this manner, number of operations 108 may be one or more operations. Number of operations 108 may include, for example, without limitation, at least one of a machining operation, a drilling operation, a sanding operation, a routing operation, a milling operation, a testing operation, an imaging operation, and some other type of operation.

Object 110 is an example of one of objects 102 of type 104. Tool 106 may be used to perform number of operations 108 at surface 112 of object 110. In one illustrative example, tool 106 may be used to remove portion of material 114 up to selected depth 115 relative to surface 112 of object 110. In some cases, tool 106 may be used to perform scarfing operations. For example, without limitation, tool 106 may be a mill device, a routing device, a sanding device, or some other type of cutting tool used to remove portion of material 114 up to selected depth 115 relative to surface 112 of object 110. Depending on the implementation, selected depth 115 may be substantially constant across surface 112 or may vary along surface 112.

In these illustrative examples, tool 106 may be operated using robotic system 116. Robotic system 116 may comprise any number of electromechanical components and, in some cases, other types of components, configured to operate tool 106. Robotic system 116 may be fully autonomous, semi-autonomous, or remotely controlled, depending on the implementation.

Robotic system 116 may be configured to operate tool 106 based on commands received from path manager 118. Path manager 118 may be implemented using hardware, software, or a combination of the two. In some cases, path manager 118 may be implemented in computer system 119.

Computer system 119 may be comprised of one or more computers, depending on the implementation. When more than one computer is present in computer system 119, these computers may be in communication with each other. These computers may be located in a same location or in different locations. In some cases, at least a portion of computer system 119 may be implemented within robotic system 116.

When path manager 118 is implemented in a portion of computer system 119 separate from robotic system 116, path manager 118 may communicate with robotic system 116 using one or more wired communications links, wireless communications links, optical communications links, and/or other types of communications links. Of course, in other illustrative examples, some or all of path manager 118 may be implemented within a processor unit, a microprocessor, an electronic circuit, or some other type of hardware and/or software unit within robotic system 116.

Path manager 118 is configured to identify the tool path to be used by tool 106 when performing number of operations 108 on each of objects 102. In particular, path manager 118 may generate a customized tool path for each of objects 102 to account for variations in the overall shapes of objects 102. For example, although all of objects 102 may be of the same type 104, at least one of objects 102 may have an overall shape that is different from at least another one of objects 102.

In these illustrative examples, path manager 118 is configured to generate reference tool path 120. Reference tool path 120 may be used as a base tool path. Reference tool path 120 may then be modified for each of objects 102 such that a customized tool path may be generated for each of objects 102.

Reference tool path 120 may be identified based on expected shape 122 for the surface of each of objects 102. Expected shape 122 may be identified using, for example, without limitation, surface profile 124. Surface profile 124 may be, for example, without limitation, a digital representation of a shape for the surface of an object of type 104.

In some illustrative examples, surface profile 124 may be generated using, for example, without limitation, digital surface mapping technology. In other illustrative examples, surface profile 124 may be part of three-dimensional model 126 for objects of type 104. Three-dimensional model 126 may take the form of, but is not limited to, a three-dimensional computer-aided design (CAD) model or some other type of three-dimensional digital model. In some cases, three-dimensional model 126 may be retrieved from, for example, database 128. Database 128 may take the form of a parts database, a design database, or some other type of database.

In still other illustrative examples, three-dimensional model 126 for objects 102 may be generated using reference object 130. Reference object 130 may be an object of the same type 104 as objects 102. Reference object 130 may be, for example, without limitation, a prototype for objects 102 of type 104, a previously processed object of type 104, one of objects 102, a test object, an object of type 104 needing to be replaced with one of objects 102, or some other type of reference object.

In one illustrative example, an imaging system may be used to image reference object 130 and form three-dimensional model 126. The imaging system may take the form of, for example, without limitation, an ultrasound imaging system, an infrared imaging system, a computed tomography imaging system, a laser imaging system, or some other type of imaging system.

As depicted, reference tool path 120 may be generated with respect to reference coordinate system 132. For example, reference tool path 120 may be comprised of plurality of points 134. Point 136 may be an example of one of plurality of points 134 that form reference tool path 120. Point 136 may correspond to position 138 and orientation 140 for tool 106.

Position 138 may be the position within reference coordinate system 132 to which a reference point on tool 106 or a center point on tool 106 is to be moved. Orientation 140 may be the angle at which tool 106 needs to be oriented when tool 106 is at position 138 within reference coordinate system 132 such that tool 106 is substantially perpendicular to the object being processed based on expected shape 122 for the object.

Path manager 118 is also configured to identify sampling path 141 comprising plurality of sample points 142. Similar to plurality of points 134 for reference tool path 120, each of plurality of sample points 142 may correspond to a position and orientation for tool 106 with respect to reference coordinate system 132. In some cases, plurality of sample points 142 may be selected as a subset of plurality of points 134.

In one illustrative example, sampling path 141 may be identified based on grid pattern 143. For example, the points in plurality of points 134 along reference tool path 120 that overlap with the intersections in grid pattern 143 may be selected as plurality of sample points 142 for sampling path 141. Of course, in other illustrative examples, plurality of sample points 142 that form sampling path 141 may be selected based on some other type of pattern.

The density of sample points along sampling path 141 may be substantially constant or may vary, depending on the implementation. For example, the density of sample points identified for a particular area of the surface of an object based on expected shape 122 may be determined by at least one of an amount of variation in expected shape 122 corresponding to the particular area, a complexity of expected shape 122 corresponding to the particular area, and whether the particular area corresponds to an edge of the object. Sampling path 141 may be selected such that the density of sample points in areas of a surface expected to have a higher variability in shape and/or have increased complexity of shape is greater than the density of sample points that are expected to have less variability in shape and/or have reduced complexity of shape.

Sampling path 141 is identified for use in evaluating each of objects 102 to be processed. For example, surface measurement device 144 may be used to generate plurality of measurements 146 for plurality of sample points 142. Plurality of measurements 146 includes a measurement for each one of plurality of sample points 142.

In one illustrative example, surface measurement device 144 may be associated with robotic system 116. For example, surface measurement device 144 and tool 106 may both be end effector devices that may be attached to robotic system 116. Robotic system 116 may be configured to guide surface measurement device 144 along sampling path 141 based on commands from path manager 118.

Plurality of measurements 146 generated by surface measurement device 144 may be used to generate offset data 150. Offset data 150 may identify a difference between expected shape 122 for the surface of an object and the actual shape of the surface of the object. For example, actual shape 147 of surface 112 of object 110 may be different from expected shape 122 for the surface of the object. This difference may be caused by deformations in the overall shape of object 110 over time, warping of the overall shape of object 110, and/or other types of inconsistencies in the overall shape of object 110 that may make the overall shape of object 110 different from the overall expected shape for object 110.

In one illustrative example, surface measurement device 144 may comprise probe 148. In this illustrative example, probe 148 may comprise an elongate member configured to freely translate along an axis through probe 148. For example, the elongate member may be configured to freely extend out of and freely retract into a cylinder in probe 148.

Probe 148 may be guided along sampling path 141 by robotic system 116. For example, probe 148 may be guided along sampling path 141 over surface 112 of object 110. At each of plurality of sample points 142, the elongate member of probe 148 may be expected to be extended, or retracted, relative to some reference position for the elongate member based on expected shape 122 for surface 112 of object 110.

Surface measurement device 144 generates a measurement at each of plurality of sample points 142 based on the actual extension, or retraction, of the elongate member. In this manner, surface measurement device 144 generates plurality of measurements 146 for plurality of sample points 142.

Path manager 118 may be configured to receive plurality of measurements 146 and generate offset data 150 based on plurality of measurements 146. Of course, in other illustrative examples, surface measurement device 144 may be configured to generate offset data 150 using measurements 146.

Offset data 150 may comprise plurality of offsets 152. Each one of plurality of offsets 152 may be generated based on a corresponding one of plurality of measurements 146. Each one of plurality of offsets 152 identifies a difference between expected shape 122 for surface 112 of object 110 and the actual shape of surface 112 of object 110 at the corresponding sample point.

Path manager 118 is configured to modify reference tool path 120 using offset data 150 to form modified tool path 154. In particular, path manager 118 is configured to modify at least a portion of plurality of points 134 in reference tool path 120 using offset data 150 to form modified tool path 154.

In one illustrative example, for each of plurality of points 134 to be modified, path manager 118 may identify corresponding subset 158 of offset data 150. For each point in plurality of points 134 to be modified, corresponding subset 158 of offset data 150 may be portion of plurality of offsets 152 that have generated for the one or more sample points in plurality of sample points 142 that are within some selected range of the point to be modified.

In some illustrative examples, weighting algorithm 160 may be applied to corresponding subset 158 of offset data 150 to identify a modified point for the point in reference tool path 120. As one illustrative example, weighting algorithm 160 may indicate that offsets generated for sample points closer to the point to be modified are to be weighted more heavily than offsets generated for sample points further away from the point to be modified. In this manner, plurality of modified points 156 may be generated to form modified tool path 154 for use with object 110.

Modified tool path 154 may be used by tool 106 to perform number of operations 108 at surface 112 of object 110. Modified tool path 154 is modified to take into account the difference between expected shape 122 for surface 112 of object 110 and the actual shape of surface 112 of object 110. In this manner, modified tool path 154 is a customized tool path for object 110. Using modified tool path 154 may result in number of operations 108 being performed on object 110 with a greater level of accuracy as compared to using reference tool path 120.

In this manner, each of objects 102 to be processed may not need to be fully imaged and modeled in order to ensure that number of operations 108 are performed with the desired level of accuracy. The process described above may reduce the overall amount of time, effort, resources, and cost needed to process objects 102 of the same type 104.

The illustration of environment 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

In some illustrative examples, modified tool path 154 generated based on object 110 may be used to perform number of operations 108 on some other workpiece. For example, object 110 may be a part needing to be replaced. Modified tool path 154 generated based on object 110 may be used to machine a workpiece to have a same shape as object 110 within selected tolerances. In other illustrative examples, surface measurement device 144 may be associated with a different robotic system instead of robotic system 116.

In still other illustrative examples, path manager 118 may be configured to generate and send commands directly to tool 106 and/or surface measurement device 144 to guide tool 106 and/or surface measurement device 144 along their respective paths. In this manner, path manager 118 may be configured to generate and send commands to at least one of tool 106 and robotic system 116 configured to control tool 106 to move tool 106 along a tool path. Further, path manager 118 may be configured to generate and second commands to at least one of surface measurement device 144 and robotic system 116 configured to control surface measurement device 144 to move surface measurement device 144 along sampling path 141.

In some illustrative examples, surface measurement device 144 may take the form of a stationary camera system positioned relative to object 110 rather than an end effector device configured for association with robotic system 116.

In other illustrative examples, surface measurement device 144 may be part of robotic system 116.

Figure 2:
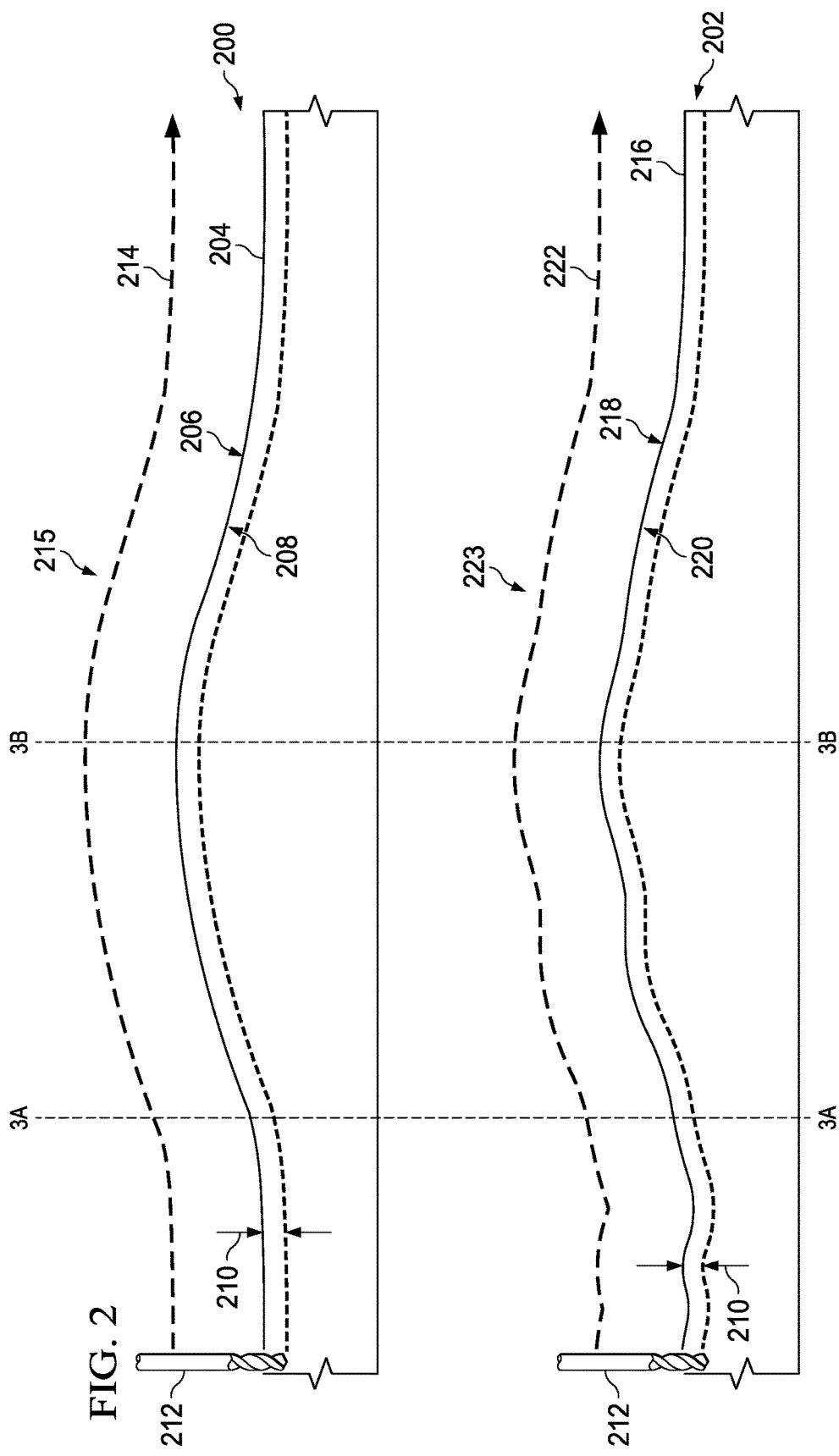
FIG. 2 is an illustration of a cross-sectional view of a reference object and of an object in accordance with an illustrative embodiment.

With reference now to FIG. 2, an illustration of a cross-sectional view of a reference object and of an object designated for processing is depicted in accordance with an illustrative embodiment. In this illustrative example, reference object 200 may be an example of one implementation for reference object 130 in FIG. 1. Object 202 may be an example of one implementation for object 110 in FIG. 1.

Reference object 200 and object 202 may be of the same type. For example, both reference object 200 and object 202 may be aircraft parts of the same type that have been used in a same manner but on two different aircraft.

In this illustrative example, reference object 200 has surface 204 with shape 206. As depicted, portion of material 208 is to be removed from reference object 200 up to selected depth 210 by machining. Selected depth 210 up to which portion of material 208 is to be removed is substantially constant across surface 204 in this illustrative example.

Tool 212 may be used to remove portion of material 208 from reference object 200. In particular, tool 212 may be guided along reference tool path 214 to perform machining at surface 204 of reference object 200. Reference tool path 214 may be an example of one implementation for reference tool path 120 in FIG. 1. In this illustrative example, reference tool path 214 is comprised of plurality of points 215.

As depicted, object 202 has surface 216. Because reference object 200 and object 202 are of the same type, surface 216 of object 202 may be expected to have shape 206. However, surface 216 of object 202 has shape 218. Shape 218 is different from shape 206. The usage of reference object 200 and object 202 on the two different aircraft has caused variations in the overall shapes of these two objects, which has, in turn, led to differences in the shapes of the surfaces of these objects.

Consequently, tool 212 along reference tool path 214 over surface 216 to perform machining at surface 216 of object 202 may cause uneven machining at surface 216. In other words, portion of material 220 that would be removed from object 202 if reference tool path 214 were to be used would result in material being removed from object 202 at varying depths along surface 216 of less than or greater than selected depth 210.

Reference tool path 214 may be modified to form modified tool path 222. Modified tool path 222 is an example of one implementation for modified tool path 154 in FIG. 1. In this illustrative example, modified tool path 222 is comprised of plurality of modified points 223. Modified tool path 222 may be generated for object 202 in a manner similar to the manner in which modified tool path 154 in FIG. 1 is generated.

Figure 3:
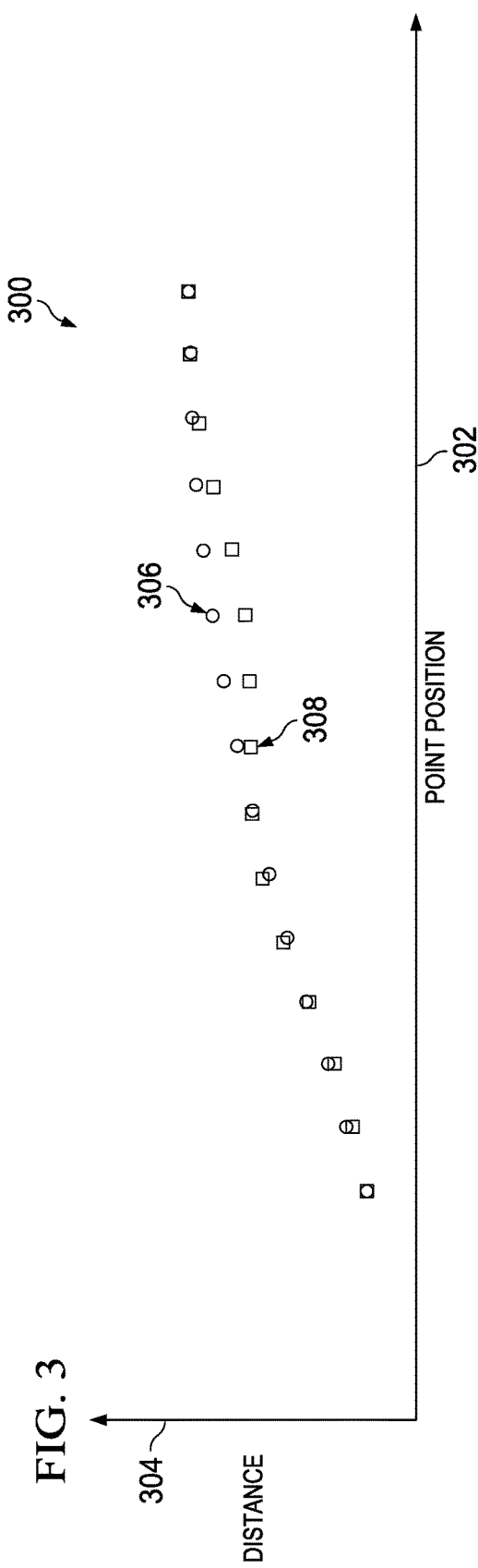
FIG. 3 is an illustration of a chart comparing a portion of a reference tool path and a modified tool path in accordance with an illustrative embodiment.

With reference now to FIG. 3, an illustration of a chart comparing a portion of reference tool path 214 from FIG. 2 and modified tool path 222 from FIG. 2 is depicted in accordance with an illustrative embodiment. In this illustrative example, chart 300 includes horizontal axis 302 and vertical axis 304. Horizontal axis 302 is the position of a point along a tool path. Vertical axis 304 is the distance relative to some reference plane through the object.

Curve 306 represents the portion of reference tool path 214 between line 3A-3A and line 3B-3B in FIG. 2. Each circle of curve 306 represents a corresponding point in reference tool path 214. Curve 308 represents the portion of modified tool path 222 between lines 3A-3A and line 3B-3B in FIG. 2. Each square in curve 308 represents a corresponding point in modified tool path 222. As depicted, at least a portion of the squares in curve 308 are offset from the corresponding circles in curve 306.

Figure 4:
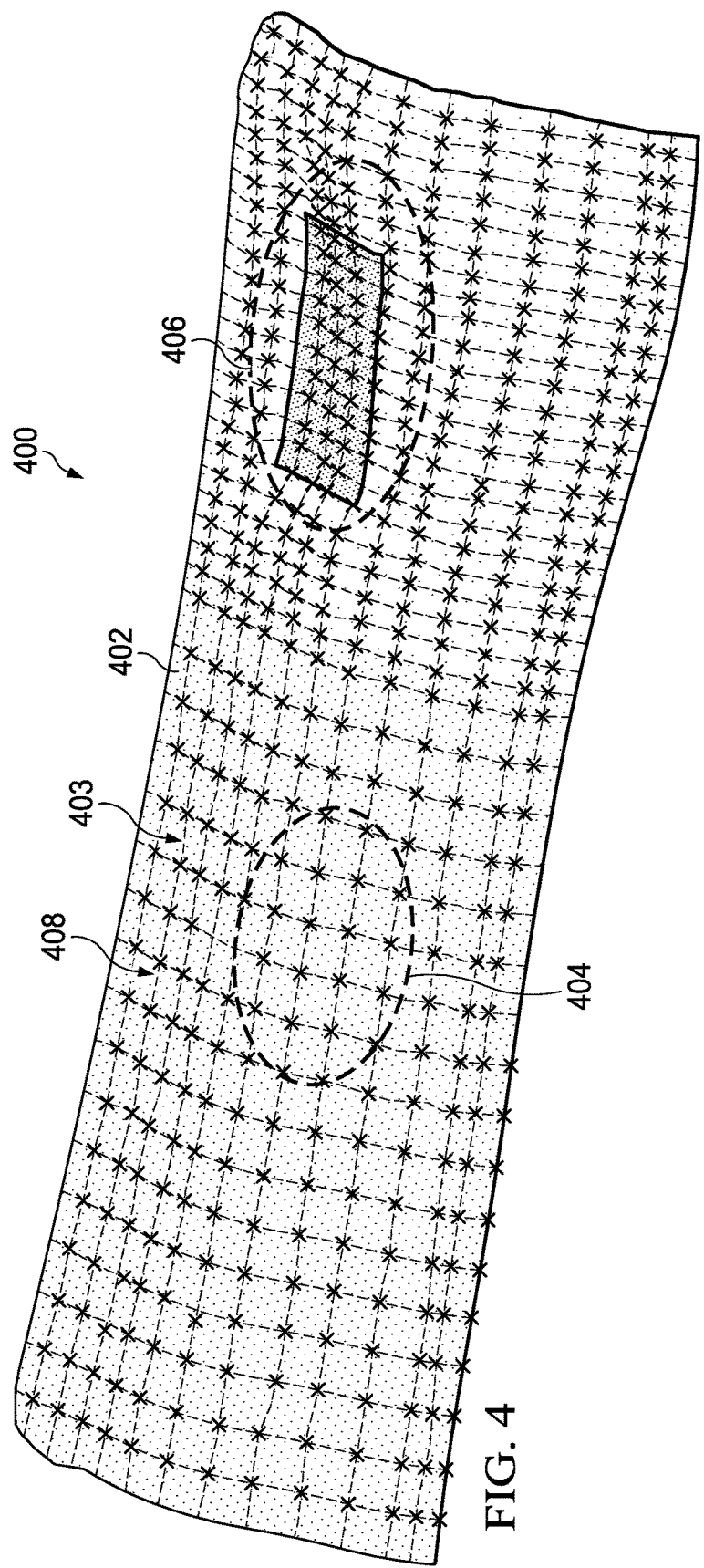
FIG. 4 is an illustration of an object configured to be processed in accordance with an illustrative embodiment.

With reference now to FIG. 4, an illustration of an object configured to be processed is depicted in accordance with an illustrative embodiment. In this illustrative example, object 400 may be an example of one implementation for object 110 in FIG. 1. In this illustrative example, object 400 has surface 402 with shape 403. As depicted, different portions of surface 402 have different shapes. For example, portion 404 of surface 402 has a different shape as compared to portion 406 of surface 402.

Grid pattern 408 is an example of one implementation for grid pattern 143 in FIG. 1. In particular, grid pattern 408 is an example of one implementation in which sampling path 141 from FIG. 1 may be implemented. The intersection of lines in grid pattern 408 identify the plurality of sample points 142 in FIG. 1 at which surface 402 of object 400 is to be evaluated. Although grid pattern 408 is shown in FIG. 4, any other type of pattern may be used to identify sample points.

Figure 5:
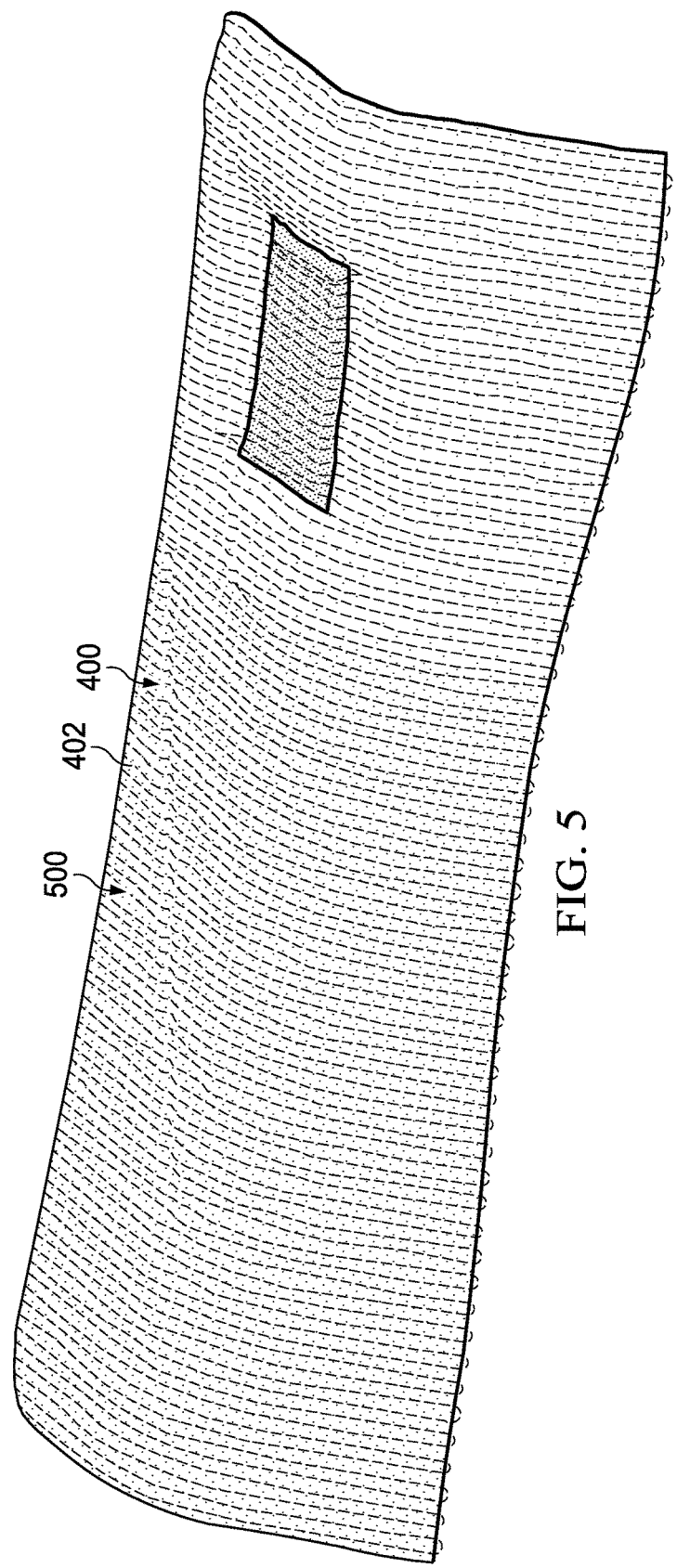
FIG. 5 is an illustration of a reference tool path in accordance with an illustrative embodiment.

Turning now to FIG. 5, an illustration of a reference tool path is depicted in accordance with an illustrative embodiment. In this illustrative example, reference tool path 500 is depicted over surface 402 of object 400. Reference tool path 500 may be an example of one implementation for reference tool path 120 in FIG. 1. A tool (not shown) may be guided along reference tool path 500 and used to perform any number of operations at surface 402 of object 400.

Reference tool path 500 may have been identified for the tool based on an expected shape for the surface of object 400. However, the actual shape 403 of surface 402 of object 400 may vary from the expected shape. Consequently, in this illustrative example, the tool may be unable to perform the number of operations at surface 402 of object 400 with a desired level of accuracy if the tool is guided along reference tool path 500.

Figure 6:
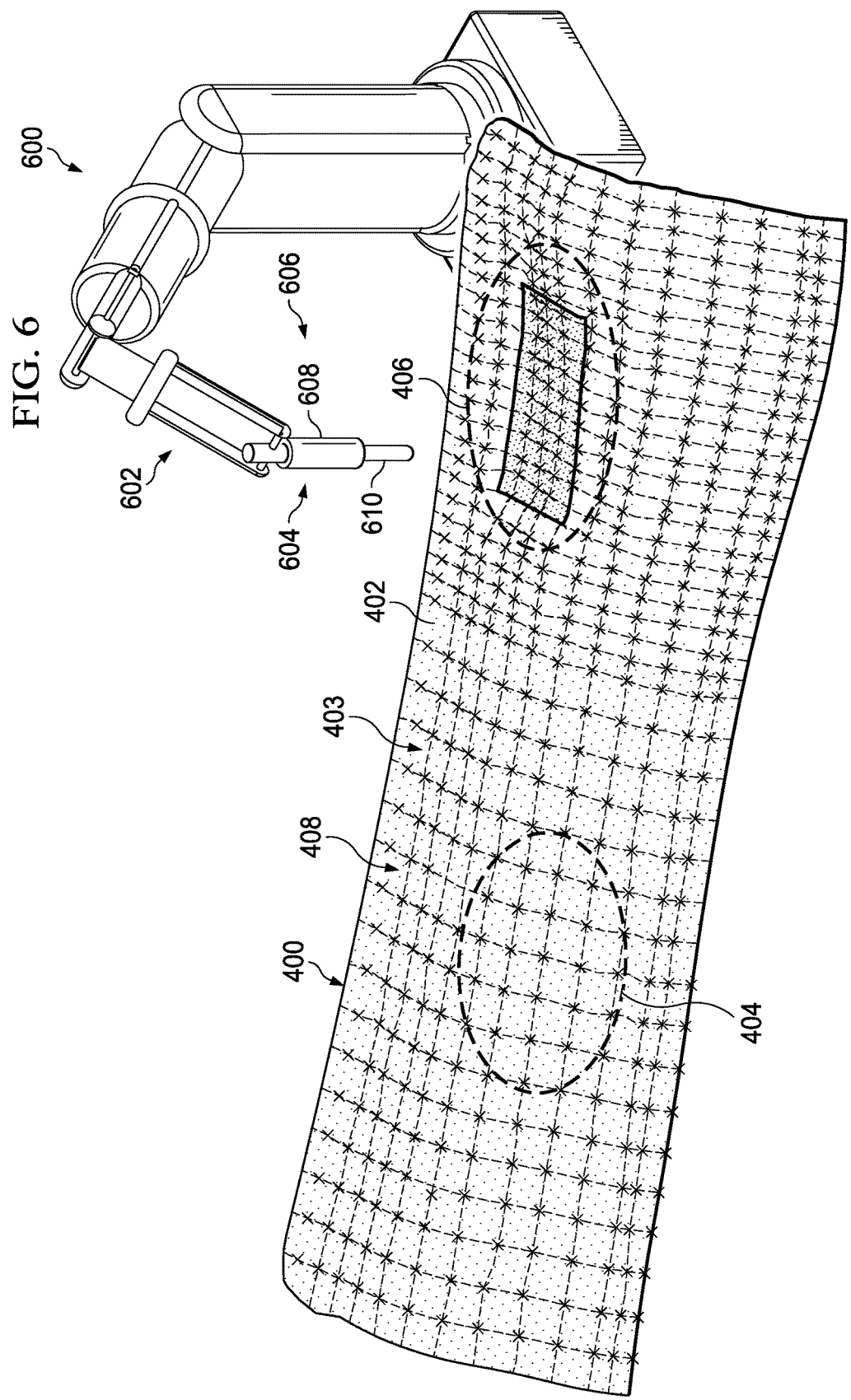
FIG. 6 is an illustration of a robotic system positioned near an object in accordance with an illustrative embodiment.

With reference now to FIG. 6, an illustration of a robotic system positioned near object 400 from FIG. 4 is depicted in accordance with an illustrative embodiment. In this illustrative example, robotic system 600 may be an example of one implementation for robotic system 116 in FIG. 1.

As depicted, robotic system 600 has robotic arm 602 and surface measurement device 604 attached to robotic arm 602. Surface measurement device 604 takes the form of probe 606 in this illustrative example. Probe 606 may be an example of one implementation for probe 148 in FIG. 1. Robotic arm 602 may be operated to move probe 606 to the sample points identified by grid pattern 408.

As depicted, probe 606 comprises cylinder 608 and elongate member 610. Elongate member 610 may be configured to move freely relative to cylinder 608. In particular, elongate member 610 may be allowed to freely extend out of cylinder and/or freely retract into cylinder 608 in response to contact of elongate member 610 with surface 402.

At each of the sample points identified by grid pattern 408, probe 606 may be used to measure the difference between the expected extension, or retraction, of probe 606, at that sample point and the actual extension, or retraction, respectively, of probe 606 at that sample point. This difference may be used as an offset, such as one of plurality of offsets 152 in FIG. 1. In this manner, probe 606 may be used to generate offset data for the sample points identified by grid pattern 408.

Figure 7:
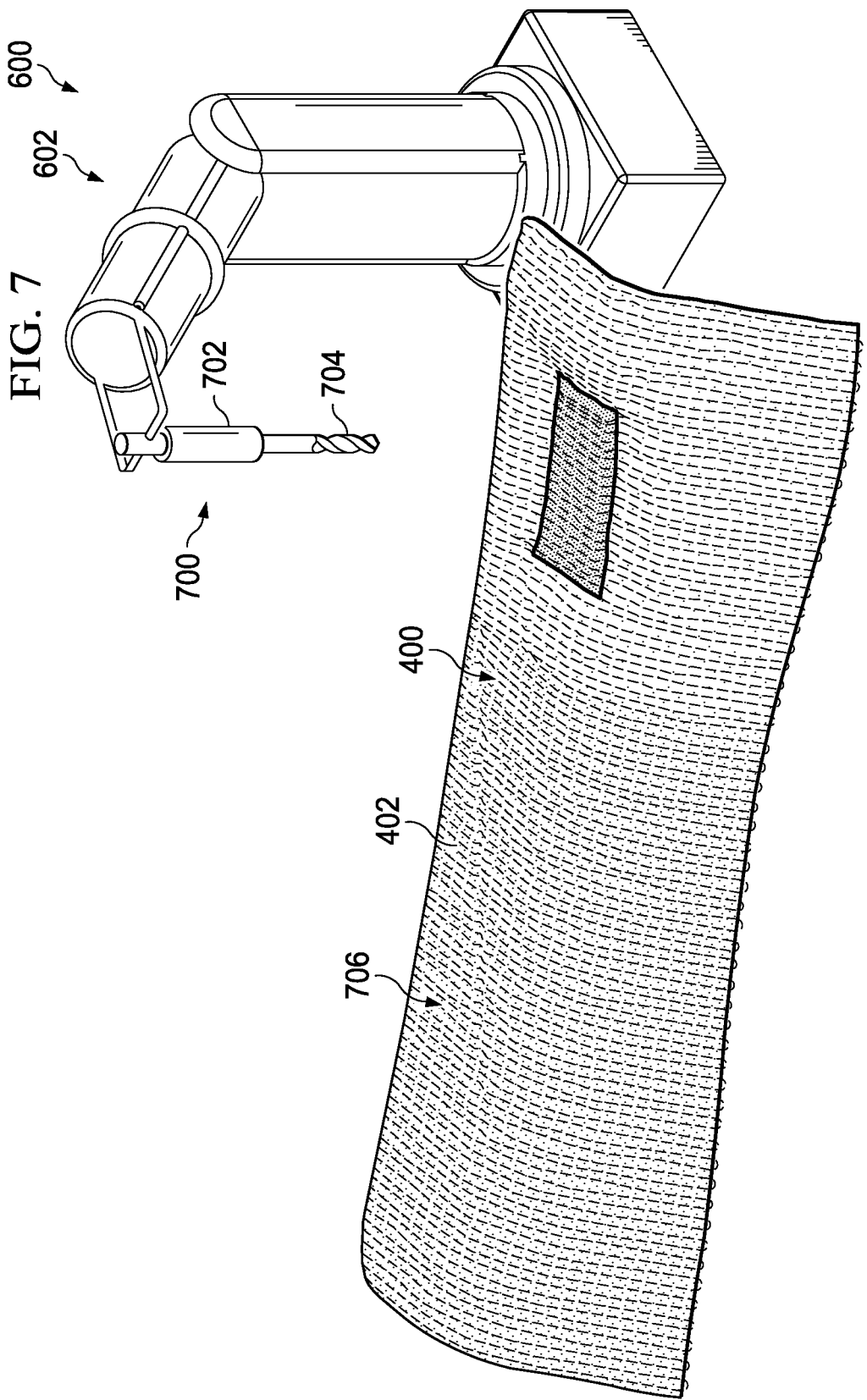
FIG. 7 is an illustration of a robotic system positioned near an object in accordance with an illustrative embodiment.

With reference now to FIG. 7, an illustration of a robotic system positioned near object 400 from FIG. 4 is depicted in accordance with an illustrative embodiment. In this illustrative example, surface measurement device 604 from FIG. 6 has been removed from robotic system 600 and replaced with tool 700. Tool 700 is an example of one implementation for tool 106 in FIG. 1.

As depicted, tool 700 has housing 702 and bit 704. Bit 704 may be used to machine object 400 at surface 402. Robotic arm 602 may be operated to move tool 700 along modified tool path 706. Modified tool path 706 may be generated by modifying at least a portion of the points along reference tool path 500 from FIG. 5 based on the offset data generated using probe 606 in FIG. 6.

The illustrations of object 400 in FIGS. 4-7 and robotic system 600 in FIGS. 6-7 are not meant to imply physical or architectural limitations to the manner in which an illustrative embodiment may be implemented. Other components in addition to or in place of the ones illustrated may be used. Some components may be optional.

The different components shown in FIGS. 4-7 may be illustrative examples of how components shown in block form in FIG. 1 can be implemented as physical structures. Additionally, some of the components in FIGS. 4-7 may be combined with components in FIG. 1, used with components in FIG. 1, or a combination of the two.

Figure 8:
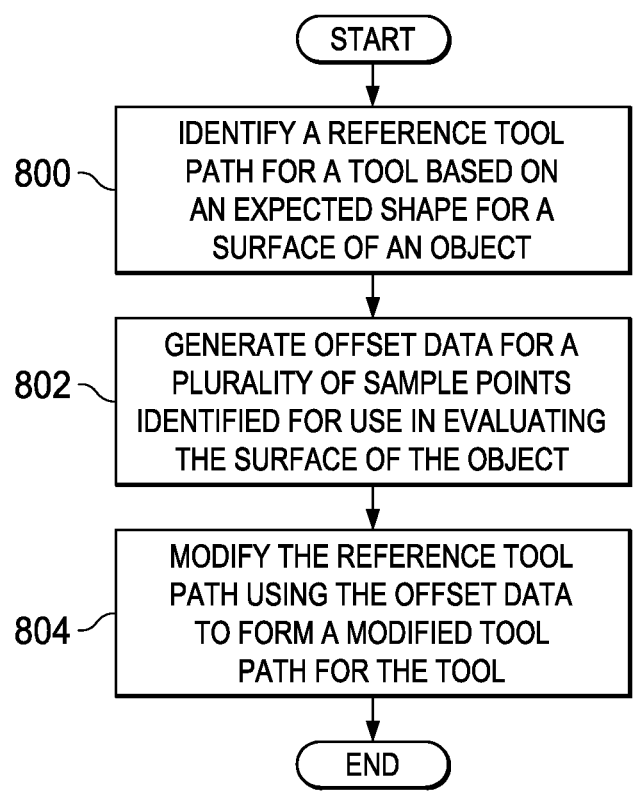
FIG. 8 is an illustration of a process for customizing the tool path to be used for each of a plurality of objects in the form of a flowchart in accordance with an illustrative embodiment.

With reference now to FIG. 8, an illustration of a process for customizing the tool path to be used for each of a plurality of objects is depicted in the form of a flowchart in accordance with an illustrative embodiment. The process illustrated in FIG. 8 may be implemented using path manager 118 in FIG. 1.

The process begins by identifying a reference tool path for a tool based on an expected shape for a surface of an object (operation 800). Next, offset data is generated for a plurality of sample points identified for use in evaluating the surface of the object (operation 802). The offset data identifies a difference between the expected shape for the surface of the object and an actual shape of the surface of the object.

The reference tool path is then modified using the offset data to form a modified tool path for the tool (operation 804), with the process terminating thereafter. The modified tool path generated in operation 804 may be used to perform a number of operations at the surface of the object using the tool.

Figure 9:
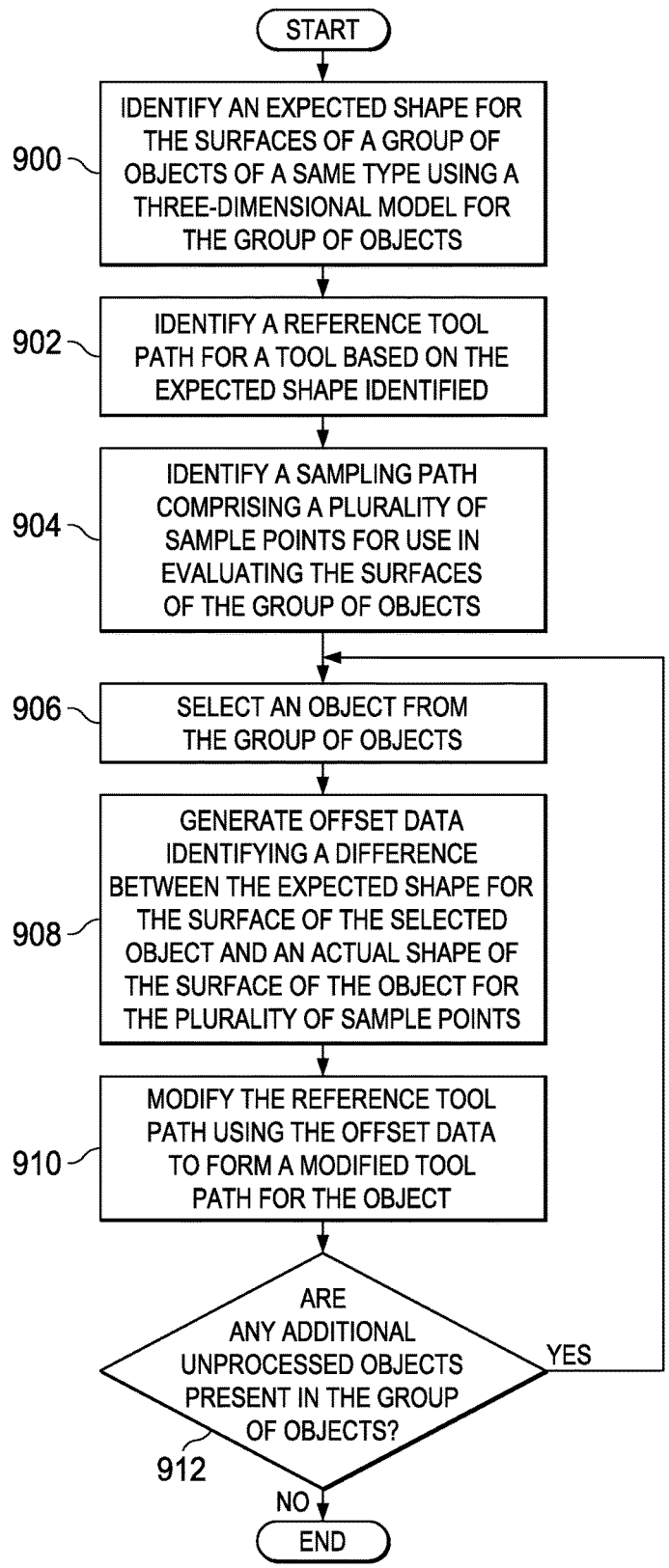
FIG. 9 is an illustration of a process for customizing the tool path to be used for each of a plurality of objects in the form of a flowchart in accordance with an illustrative embodiment.

With reference now to FIG. 9, an illustration of a process for customizing the tool path to be used for each of a plurality of objects is depicted in the form of a flowchart in accordance with an illustrative embodiment. The process illustrated in FIG. 9 may be implemented using path manager 118 in FIG. 1.

The process begins by identifying an expected shape for the surfaces of a group of objects of a same type using a three-dimensional model for the group of objects (operation 900). Next, a reference tool path for a tool is identified based on the expected shape identified (operation 902). Thereafter, a sampling path comprising a plurality of sample points is identified for use in evaluating the surfaces of the group of objects (operation 904).

An object is then selected from the group of objects (operation 906). Offset data identifying a difference between the expected shape for the surface of the selected object and an actual shape of the surface of the object is generated for the plurality of sample points (operation 908). Thereafter, the reference tool path is modified using the offset data to form a modified tool path for the object (operation 910).

The process then determines whether any additional unprocessed objects are present in the group of objects (operation 912). If additional unprocessed objects are not present, the process terminates. Otherwise, the process returns to operation 906 described above.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Illustrative embodiments of the disclosure may be described in the context of aircraft manufacturing and service method 1000 as shown in FIG. 10 and aircraft 1100 as shown in FIG. 11. Turning first to FIG. 10, an illustration of an aircraft manufacturing and service method in the form of a block diagram is depicted in accordance with an illustrative embodiment. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 in FIG. 11 takes place. Thereafter, aircraft 1100 in FIG. 11 may go through certification and delivery 1010 in order to be placed in service 1012. While in service 1012 by a customer, aircraft 1100 in FIG. 11 is scheduled for routine maintenance and service 1014, which may include modification, reconfiguration, refurbishment, and other maintenance or service.

Each of the processes of aircraft manufacturing and service method 1000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of an aircraft in the form of a block diagram is depicted in which an illustrative embodiment may be implemented. In this example, aircraft 1100 is produced by aircraft manufacturing and service method 1000 in FIG. 10 and may include airframe 1102 with systems 1104 and interior 1106. Examples of systems 1104 include one or more of propulsion system 1108, electrical system 1110, hydraulic system 1112, and environmental system 1114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1000 in FIG. 10. For example, tool 106 may be used to perform operations on parts for aircraft 1100 based on modified tool paths, such as modified tool path 154 in FIG. 1, generated by a path manager, such as path manager 118 in FIG. 1. These operations may be performed during any one of the stages of aircraft manufacturing and service method 1000. For example, the operations may be performed during any one of production, component and subassembly manufacturing 1006 and/or routine maintenance and service 1014.

In one illustrative example, components or subassemblies produced in component and subassembly manufacturing 1006 in FIG. 10 may be fabricated or manufactured in a manner similar to components or subassemblies produced while aircraft 1100 is in service 1012 in FIG. 10. As yet another example, one or more apparatus embodiments, method embodiments, or a combination thereof may be utilized during production stages, such as component and subassembly manufacturing 1006 and system integration 1008 in FIG. 10. One or more apparatus embodiments, method embodiments, or a combination thereof may be utilized while aircraft 1100 is in service 1012 in FIG. 10 and/or during maintenance and service 1014 in FIG. 10. The use of a number of the different illustrative embodiments may substantially expedite the assembly of and/or reduce the cost of aircraft 1100.

Turning now to FIG. 12, an illustration of a data processing system in the form of a block diagram is depicted in accordance with an illustrative embodiment. Data processing system 1200 may be used to implement one or more computers in computer system 119 in FIG. 1. As depicted, data processing system 1200 includes communications framework 1202, which provides communications between processor unit 1204, storage devices 1206, communications unit 1208, input/output unit 1210, and display 1212. In some cases, communications framework 1202 may be implemented as a bus system.

Processor unit 1204 is configured to execute instructions for software to perform a number of operations. Processor unit 1204 may comprise a number of processors, a multi-processor core, and/or some other type of processor, depending on the implementation. In some cases, processor unit 1204 may take the form of a hardware unit, such as a circuit system, an application specific integrated circuit (ASIC), a programmable logic device, or some other suitable type of hardware unit.

Instructions for the operating system, applications, and/or programs run by processor unit 1204 may be located in storage devices 1206. Storage devices 1206 may be in communication with processor unit 1204 through communications framework 1202. As used herein, a storage device, also referred to as a computer readable storage device, is any piece of hardware capable of storing information on a temporary and/or permanent basis. This information may include, but is not limited to, data, program code, and/or other information.

Memory 1214 and persistent storage 1216 are examples of storage devices 1206. Memory 1214 may take the form of, for example, a random access memory or some type of volatile or non-volatile storage device. Persistent storage 1216 may comprise any number of components or devices. For example, persistent storage 1216 may comprise a hard drive, a flash memory, a rewritable optical disk, a rewritable magnetic tape, or some combination of the above. The media used by persistent storage 1216 may or may not be removable.

Communications unit 1208 allows data processing system 1200 to communicate with other data processing systems and/or devices. Communications unit 1208 may provide communications using physical and/or wireless communications links.

Input/output unit 1210 allows input to be received from and output to be sent to other devices connected to data processing system 1200. For example, input/output unit 1210 may allow user input to be received through a keyboard, a mouse, and/or some other type of input device. As another example, input/output unit 1210 may allow output to be sent to a printer connected to data processing system 1200.

Display 1212 is configured to display information to a user. Display 1212 may comprise, for example, without limitation, a monitor, a touch screen, a laser display, a holographic display, a virtual display device, and/or some other type of display device.

In this illustrative example, the processes of the different illustrative embodiments may be performed by processor unit 1204 using computer-implemented instructions. These instructions may be referred to as program code, computer usable program code, or computer readable program code and may be read and executed by one or more processors in processor unit 1204.

In these examples, program code 1218 is located in a functional form on computer readable media 1220, which is selectively removable, and may be loaded onto or transferred to data processing system 1200 for execution by processor unit 1204. Program code 1218 and computer readable media 1220 together form computer program product 1222. In this illustrative example, computer readable media 1220 may be computer readable storage media 1224 or computer readable signal media 1226.

Computer readable storage media 1224 is a physical or tangible storage device used to store program code 1218 rather than a medium that propagates or transmits program code 1218. Computer readable storage media 1224 may be, for example, without limitation, an optical or magnetic disk or a persistent storage device that is connected to data processing system 1200.

Alternatively, program code 1218 may be transferred to data processing system 1200 using computer readable signal media 1226. Computer readable signal media 1226 may be, for example, a propagated data signal containing program code 1218. This data signal may be an electromagnetic signal, an optical signal, and/or some other type of signal that can be transmitted over physical and/or wireless communications links.

The illustration of data processing system 1200 in FIG. 12 is not meant to provide architectural limitations to the manner in which the illustrative embodiments may be implemented. The different illustrative embodiments may be implemented in a data processing system that includes components in addition to or in place of those illustrated for data processing system 1200. Further, components shown in FIG. 12 may be varied from the illustrative examples shown.

Thus, the illustrative embodiments provide a method and apparatus for customizing tool paths. In particular, a path manager, such as, for example, path manager 118 from FIG. 1, may be configured to identify a reference tool path for use in performing operations on objects. The path manager customizes the reference tool path for each of the objects. In this manner, the modified tool path used for one of the objects may be different than the modified tool path used for another one of the objects.

These modified tool paths may be formed based on offset data generated for the objects. The offset data may be generated based on measurements taken by a surface measurement device, such as, for example, probe 148 in FIG. 1. The surface measurement device takes measurements at a sampling of the points that form the reference tool path instead of at all of the points that form the reference tool path.

Customizing the tool paths for the objects based on measurements taken at a sampling of the points that form the reference tool path instead of all of the points may increase the speed with which the tool paths may be modified. Further, the amount of processing resources that may be needed to identify the modified tool paths may also be reduced.

Further, this type of process may be faster and simpler than generating a three-dimensional model for each of the objects and using each of the three-dimensional models to generate a tool path for the corresponding object. Further, the process described above may be less expensive than generating three-dimensional models for the objects.

The method provided by the illustrative embodiments allows the performing of the operations on the objects to be automated. The method provided by the illustrative embodiments forms modified tool paths that meet a level of accuracy within selected tolerances. Consequently, one or more human operators may not be needed to perform these operations.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:
1. A method comprising:
generating a three-dimensional model of a reference object, wherein the three-dimensional model includes a surface profile of the reference object;
identifying an expected shape for a surface of an object using the surface profile of the reference object, wherein the object and the reference object are objects of a same type manufactured according to the same manufacturing specifications, wherein both the reference object and the object are aircraft parts that have been used in a same manner but on two different aircraft;
identifying a reference tool path for performing a number of operations with a tool based on the expected shape for the surface of the object;
identifying a sampling path for evaluating the surface of the object based on the expected shape for the surface of the object, wherein the sampling path comprises a plurality of sample points that defines a grid pattern for evaluating the surface of the object based on the expected shape for the surface of the object, wherein a density of the sample points within a particular area of the grid pattern is determined by at least one of an amount of variation in the expected shape within the particular area, a complexity of the expected shape within the particular area, and an edge of the object corresponding to the particular area;

generating offset data for the plurality of sample points in the sampling path, wherein the offset data identifies a difference between the expected shape for the surface of the object and the actual shape of the surface of the object;

modifying the reference tool path using the offset data to form a modified tool path for the tool; and performing the number of operations at the surface of the object using the tool and the modified tool path.

2. The method of claim 1, wherein the object is a workpiece.

3. The method of claim 1, wherein identifying the reference tool path for the tool based on the expected shape for the surface of the object comprises:

identifying the reference tool path for the tool based on the expected shape for the surface of the object indicated by the three-dimensional model, wherein the reference tool path is comprised of a plurality of points in which each of the plurality of points corresponds to a position and an orientation for the tool.

4. The method of claim 3, wherein modifying the reference tool path using the offset data to form the modified tool path for the tool path comprises:

modifying each of at least a portion of the plurality of points along the reference tool path using a corresponding subset of the offset data and a weighting algorithm to form a plurality of modified points that form the modified tool path.

5. The method of claim 4, wherein modifying at least a portion of the plurality of points along the reference tool path using the corresponding subset of the offset data and the weighting algorithm to form the plurality of modified points that form the modified tool path comprises:

selecting, for a point in the plurality of points along the reference tool path, a portion of the plurality of sample points within a selected range of the point selected; and identifying a portion of the offset data corresponding to the portion of the plurality of sample points selected as the corresponding subset of the offset data for the point.

6. The method of claim 1, wherein generating the three-dimensional model of the reference object comprises:

generating the three-dimensional model of the reference object, wherein the reference object and the object belong to a group of objects designated for processing.

7. The method of claim 1, wherein performing the number of operations at the surface of the object using the tool and the modified tool path further comprises:

performing the number of operations at the surface of the object using the tool and the modified tool path, wherein the number of operations comprises a scarfing operation performed according to the modified tool path.

8. The method of claim 7, wherein performing the scarfing operation further comprises:

removing a portion of material up to a selected depth relative to the surface of the object.

9. The method of claim 7, wherein performing the scarfing operation further comprises:

removing the portion of material with a mill device, a routing device, a sanding device, or a cutting device.

10. The method of claim 1, wherein generating the three-dimensional model of the reference object comprises:

imaging the reference object with an imaging system, wherein the imaging system is selected from one of an ultrasound imaging system, an infrared imaging system, a computed tomography imaging system, and a laser imaging system.

11. A computer-implemented method comprising:

generating a three-dimensional model of a reference object, wherein the three-dimensional model includes a surface profile of the reference object;

identifying an expected shape for a surface of an object using the surface profile of the reference object, wherein the object and the reference object are objects of a same type manufactured according to the same manufacturing specifications, wherein both the reference object and the object are aircraft parts that have been used in a same manner but on two different aircraft;

identifying a reference tool path for performing a number of operations with a tool based on the expected shape for the surface of the object;

identifying a sampling path comprising a plurality of sample points for use in evaluating the surfaces of the group of objects that defines a grid pattern for evaluating a surface of an object of the group of objects based on the expected shape for the surface of the object, wherein a density of the sample points within a particular area of the grid pattern is determined by at least one of an amount of variation in the expected shape within the particular area, a complexity of the expected shape within the particular area, and an edge of the object corresponding to the particular area;

receiving a plurality of measurements generated for the plurality of sample points in the sampling path from a surface measurement device;

generating offset data using the plurality of measurements, wherein the offset data identifies a difference between the expected shape for the surface of the object and the actual shape of the surface of the object;

modifying the reference tool path using the offset data to form a modified tool path for the tool;

directing a tool along the surface of the object using the modified tool path.

12. The computer-implemented method of claim 11 further comprising:

generating commands for use by at least one of the tool and a robotic system configured to operate the tool to move the tool along the modified tool path.

13. The computer-implemented method of claim 11 further comprising:

generating commands for use by at least one of the surface measurement device and a robotic system configured to operate the surface measurement device to move the surface measurement device along the sampling path and generate the plurality of measurements along the sampling path.

14. The computer-implemented method of claim 11, wherein modifying the reference tool path using the offset data to form the modified tool path for tool comprises:

modifying each of at least a portion of a plurality of points along the reference tool path using a corresponding subset of the offset data and a weighting algorithm to form a plurality of modified points that form the modified tool path.

15. The computer-implemented method of claim 11, wherein performing the number of operations at the surface of the object using the tool and the modified tool path further comprises:

performing the number of operations at the surface of the object using the tool and the modified tool path, wherein the number of operations comprises a scarfing operation performed according to the modified tool path.

16. The computer-implemented method of claim 15, wherein performing the scarfing operation further comprises:
   removing a portion of material up to a selected depth relative to the surface of the object.

17. The computer-implemented method of claim 15, wherein performing the scarfing operation further comprises:
   removing the portion of material with a mill device, a routing device, a sanding device, or a cutting device.

18. The computer-implemented method of claim 13, wherein generating the three-dimensional model of the reference object comprises:
   imaging the reference object with an imaging system, wherein the imaging system is selected from one of an ultrasound imaging system, an infrared imaging system, a computed tomography imaging system, and a laser imaging system.

\* \* \* \* \*